US011957251B2

(12) United States Patent
DeFranks et al.

(10) Patent No.: US 11,957,251 B2
(45) Date of Patent: *Apr. 16, 2024

(54) ACTIVE COMFORT CONTROLLED BEDDING SYSTEMS

(71) Applicant: DREAMWELL, LTD., Doraville, GA (US)

(72) Inventors: Michael S. DeFranks, Atlanta, GA (US); Rahul Kirtikar, Atlanta, GA (US)

(73) Assignee: DREAMWELL, LTD., Doraville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,079

(22) Filed: Dec. 7, 2021

(65) Prior Publication Data

US 2022/0087442 A1 Mar. 24, 2022

Related U.S. Application Data

(63) Continuation of application No. 15/838,659, filed on Dec. 12, 2017, now Pat. No. 11,202,515.

(51) Int. Cl.
*A61H 9/00* (2006.01)
*A47C 21/00* (2006.01)
(Continued)

(52) U.S. Cl.
CPC .......... *A47C 27/083* (2013.01); *A47C 21/006* (2013.01); *A47C 21/044* (2013.01); (Continued)

(58) Field of Classification Search
CPC ....... A47C 27/083; A47C 27/10; A47C 27/18; A47C 21/006; A47C 21/044; A47C 21/048; A61H 9/0078
See application file for complete search history.

(56) References Cited

U.S. PATENT DOCUMENTS 2,345,073 A * 3/1944 Rosett .................. A61H 9/0078 601/149
3,595,223 A * 7/1971 Castagna ............. A61H 9/0078 92/13

(Continued)

FOREIGN PATENT DOCUMENTS

CN 101835410 A 9/2010
CN 102497844 A 6/2012

(Continued)

OTHER PUBLICATIONS

International Search Report and Written Opinion, issued in International Application Application No. PCT/US2018/056495, dated Nov. 29, 2018; 11 pages.

(Continued)

*Primary Examiner* — Michael J Tsai
(74) *Attorney, Agent, or Firm* — CANTOR COLBURN LLP

(57) ABSTRACT

Active comfort controlled bedding systems include a variable firmness control and/or variable climate control. The active comfort controlled bedding systems generally include a plurality of air bladders, each one of the plurality of air bladders includes a pressure sensor configured to measure pressure within a respective air bladder. A control unit configured to selectively operate a pump and valves to sequentially adjust a pressure in two or more of the plurality of air bladders having an applied load of an end user thereon to provide a repeating pattern within the two or more plurality of air bladders, wherein the repeating pattern is defined by a pressure increase and subsequent decrease in a selected one of the plurality of air bladders followed a pressure increase and subsequent decrease in a selected other one of the plurality of air bladders to provide a massaging action.

6 Claims, 8 Drawing Sheets

(51) Int. Cl.
*A47C 21/04* (2006.01)
*A47C 27/08* (2006.01)
*A47C 27/10* (2006.01)
*A47C 27/18* (2006.01)
*A47C 31/10* (2006.01)
*A61G 7/057* (2006.01)

(52) U.S. Cl.
CPC ............ *A47C 21/048* (2013.01); *A47C 27/10* (2013.01); *A47C 27/18* (2013.01); *A47C 31/105* (2013.01); *A61H 9/0078* (2013.01); *A61G 7/05769* (2013.01); *A61G 7/05784* (2016.11); *A61G 2203/34* (2013.01); *A61H 2201/0103* (2013.01); *A61H 2201/0107* (2013.01); *A61H 2201/0146* (2013.01); *A61H 2201/1604* (2013.01); *A61H 2201/1623* (2013.01); *A61H 2201/5002* (2013.01); *A61H 2201/5038* (2013.01); *A61H 2201/5051* (2013.01); *A61H 2201/5071* (2013.01); *A61H 2203/0456* (2013.01); *A61H 2205/02* (2013.01); *A61H 2205/081* (2013.01); *A61H 2205/10* (2013.01)

(56) References Cited

U.S. PATENT DOCUMENTS 5,192,304 A * 3/1993 Rassman .............. A61H 9/0078 5/933
5,642,546 A 7/1997 Shoenhair
5,815,865 A 10/1998 Washburn et al.
6,336,907 B1 * 1/2002 Dono ................... A61H 9/0078 601/150
6,551,450 B1 * 4/2003 Thomas ............... A61H 9/0078 297/284.6
6,572,570 B1 * 6/2003 Burns ................ A61H 33/6089 601/148
6,629,941 B1 * 10/2003 Ishibashi .............. A61H 9/0078 601/152
6,810,542 B1 * 11/2004 Mitchell .............. A61H 9/0078 5/644
7,877,827 B2 2/2011 Marquette et al.
7,996,936 B2 8/2011 Marquette et al.
8,065,763 B2 11/2011 Brykalski et al.
8,181,290 B2 5/2012 Brykalski et al.
8,191,187 B2 6/2012 Brykalski et al.
10,342,358 B1 7/2019 Palashewski
10,463,526 B1 * 11/2019 Zur ...................... A61H 9/0078
2005/0126578 A1 * 6/2005 Garrison .............. A61H 9/0078 128/874
2006/0117488 A1 * 6/2006 Hung ................. A61G 7/05776 5/713
2008/0148481 A1 * 6/2008 Brykalski ............ A47C 21/048 5/423
2008/0221493 A1 * 9/2008 Schock ................ A61H 9/0078 607/104
2009/0044342 A1 * 2/2009 Cengarle .............. A61H 9/0078 5/711
2010/0011502 A1 * 1/2010 Brykalski .............. A47C 21/04 5/423
2010/0293715 A1 11/2010 Sakamoto et al.
2011/0119826 A1 5/2011 Marquette et al.
2011/0258778 A1 10/2011 Brykalski et al.
2011/0296611 A1 12/2011 Marquette et al.
2012/0131748 A1 5/2012 Brykalski et al.
2012/0227182 A1 9/2012 Brykalski et al.
2013/0111672 A1 5/2013 Rensink
2015/0007393 A1 1/2015 Palashewski
2016/0059750 A1 * 3/2016 Lem ....................... B60N 2/976 601/149
2016/0317370 A1 * 11/2016 Evans .................... G05B 15/02
2017/0000685 A1 * 1/2017 Rohr .................... A47C 21/006 5/933
2017/0056264 A1 * 3/2017 Chapin ................ A47C 27/082
2018/0086238 A1 * 3/2018 Onuma .................. B60N 2/976
2018/0104135 A1 * 4/2018 Lem ..................... A61H 9/0078
2018/0344046 A1 12/2018 Defanks
2018/0369040 A1 * 12/2018 Sheth ................. A61G 7/05776
2019/0100124 A1 * 4/2019 Alexander ............. B60N 2/976
2019/0174930 A1 6/2019 Defranks et al.

FOREIGN PATENT DOCUMENTS

CN 104116350 A 10/2014
CN 107224141 A 10/2017
DE 19700132 A1 7/1998
WO 2004082551 A1 9/2004
WO 2011026040 A1 3/2011
WO 2019118065 A1 6/2019

OTHER PUBLICATIONS

International Search Report issued in International Patent Application No. PCT/US2018/056495, dated Jul. 29, 2018 (4 pages).
Notification Concerning Transmittal of International Preliminary Report on Patentability (Chapter I of the Patent Cooperation Treaty) issued in International Application No. PCT/US2018/056495; 9 pages.
Notification Concerning Transmittal of International Preliminary Report on Patentability (Chapter I of the Patent Cooperation Treaty), issued in International Application No. PCT/US2018/025778, dated Dec. 12, 2019; 12 pages.
Notification of Transmittal of the International Search Report and the Written Opinion of the International searching Authority, or the Declaration, issued in International Application No. PCT/US2018/025778; dated Jul. 19, 2018; 7 pages.
First Office Action for Chinese Application No. 201880036026.8 dated Jun. 3, 2021.
Communication pursuant to Article 94(3) EPC for Application No. 18719382.6 dated Sep. 9, 2021.
Office Action for Vietnamese Application No. 1-2020-03898 dated Oct. 28, 2020.
Written Opinion of the International Searching Authority issued in International Application No. PCT/US2018025778, dated Jul. 19, 2018; 12 pages.
Written Opinion of the International Searching Authority, issued in International Application No. PCT/US2018/056495, dated Jul. 29, 2018; 7 pages.
Notification of the First Office Action for Chinese Application No. 201980018019.X dated Nov. 26, 2021, 19 pages.

* cited by examiner

ACTIVE COMFORT CONTROLLED BEDDING SYSTEMS

CROSS REFERENCE TO RELATED APPLICATIONS

The present application is a continuation application of U.S. patent application Ser. No. 15/838,659, filed on Dec. 12, 2017 and incorporated herein by reference in its entirety.

BACKGROUND

The present disclosure generally relates to active comfort controlled bedding systems. More particularly, the present invention relates to active comfort controlled bedding systems including variable firmness control and/or variable climate control, wherein the variable firmness can be in the form of a repeating pattern so as to provide a massaging action, a therapeutic benefit or the like.

No two consumers are alike in size, shape, personal fitness level, health, preferred sleeping position, or comfort preference. These and myriad factors affect the ability of a typical mattress assembly to compensate for the preferred firmness of each consumer. Additionally, the requirements of each consumer may change significantly over the course of a mattress's lifespan as a consumer's weight, activity level, health, and preferred sleeping position change.

Conventional bedding manufacturers have attempted to compensate for the infinite combinations of consumer preferences by releasing several models of firmnesses for each bedding line. In particular, manufacturers strive to have consumers fit into a soft/plush/firm/ultra-firm class of bedding. Similarly, manufacturers of adjustable air beds have attempted to compensate for differing consumer preferences by allowing for different pressures in one or more air bladders. However, the arrangement required of traditional air bladders generally provides for a limited number of air bladders within the mattress that span the width of the bed, or a single occupant's position on the bed. Prior arrangements provide far too low a resolution of adjustability to resolve the complexities and variances between individual users' sizes, weights, sleep patterns and the like.

Prior methods of addressing adjustable air beds use an air bladder that is generally a rectangular prism with a layer of comfort foam laid on top to achieve a soft, plush feel. Intuitively this seems like a good approach, but it results in the sleeper feeling like they are lying on top of the bed and not in the bed, arising in that difficult to describe "air bed" feel. By creating a novel construction to combine the foam and air bladder in a more integrated fashion, a foam-air hybrid bed is created, much like foam-coil hybrid beds have also been created in static comfort bedding.

Body temperature is a critical factor for restful sleep. The body prefers a certain temperature range in order to achieve and maintain deep uninterrupted sleep. For example, a bed situated within a hot, poorly-ventilated environment can be uncomfortable to the occupant and make it difficult to achieve desired rest. The user is more likely to stay awake or only achieve disruptive, uneven rest. Furthermore, even with normal air-conditioning, on a hot day, the bed occupant's back and other pressure points may remain sweaty while lying down. In the winter time, it is highly desirable to have the ability to quickly warm the bed of the occupant to facilitate the occupant's comfort, especially where heating units are unlikely to warm the indoor space as quickly. However, if the body temperature is regulated, he or she may fall asleep and stay asleep longer.

BRIEF SUMMARY

Disclosed herein are active comfort controlled bedding systems and methods of adjusting firmness and/or temperature in an active comfort controlled bedding system. In one or more embodiments, the active comfort controlled bedding system includes an innercore unit comprising a plurality of air bladders, each one of the plurality of air bladders includes a pressure sensor configured to measure pressure within a respective air bladder; a manifold fluidly coupling each one of the plurality of air bladders to a pump; a valve at an inlet of each one of the plurality of air bladders; and a control unit configured to selectively operate the pump and valves to sequentially adjust a pressure in two or more of the plurality of air bladders having an applied load of an end user thereon to provide a repeating pattern within the two or more of the plurality of air bladders, wherein the repeating pattern is defined by a pressure increase and subsequent decrease in a selected one of the plurality of air bladders followed by a pressure increase and subsequent decrease in a selected other one of the plurality of air bladders to provide a massaging action.

In one or more embodiments, the active comfort controlled bedding system includes a mattress topper overlaying a mattress comprising a plurality of air bladders, each one of the plurality of air bladders includes a pressure sensor configured to measure pressure within a respective air bladder; a manifold fluidly coupling each one of the plurality of air bladders to a pump; a valve at an inlet of each one of the plurality of air bladders; and a control unit configured to selectively operate the pump and valves to sequentially adjust a pressure in two or more of the plurality of air bladders having an applied load of an end user thereon to provide a repeating pattern within the plurality of air bladders, wherein the repeating pattern is defined by a pressure increase and subsequent decrease in a selected one of the plurality of air bladders followed a pressure increase and subsequent decrease in a selected other one of the plurality of air bladders to provide a massaging action.

In one or more embodiments, a process of providing a massaging action to an end user in an active comfort controlled bedding system, includes adjusting an internal pressure within a plurality of air bladders provided in an innercore unit having an applied load thereon from an end user, wherein each one of the plurality of air bladders includes a pressure sensor configured to measure pressure within a respective air bladder and are transversely positioned relative to a longitudinal axis of the bedding system, and wherein adjusting the internal pressure comprises providing a repeating pattern defined by a pressure increase and subsequent decrease in a selected one of the plurality of air bladders followed by a pressure increase and subsequent decrease in a selected other one of the plurality of air bladders to provide the massaging action.

The disclosure may be understood more readily by reference to the following detailed description of the various features of the disclosure and the examples included therein.

BRIEF DESCRIPTION OF THE SEVERAL VIEWS OF THE DRAWINGS

Referring now to the figures wherein the like elements are numbered alike.

DETAILED DESCRIPTION

Disclosed herein are active comfort controlled bedding systems. As will be discussed in greater detail below, the active comfort bedding systems include a plurality of air bladders and/or airflow enabled foundation surfaces. The bedding systems may be of any size, including standard sizes such as a twin, queen, oversized queen, king, or California king sized mattress, as well as custom or non-standard sizes constructed to accommodate a particular user or a particular room. The active comfort controlled bedding systems are configured as one sided having defined head, foot and torso (i.e., lumbar), and/or upper leg regions. In one or more embodiments, the active comfort controlled bedding system can be configured to provide a massaging action, a therapeutic benefit or the like as will be disclosed in greater detail below.

Figure 1:
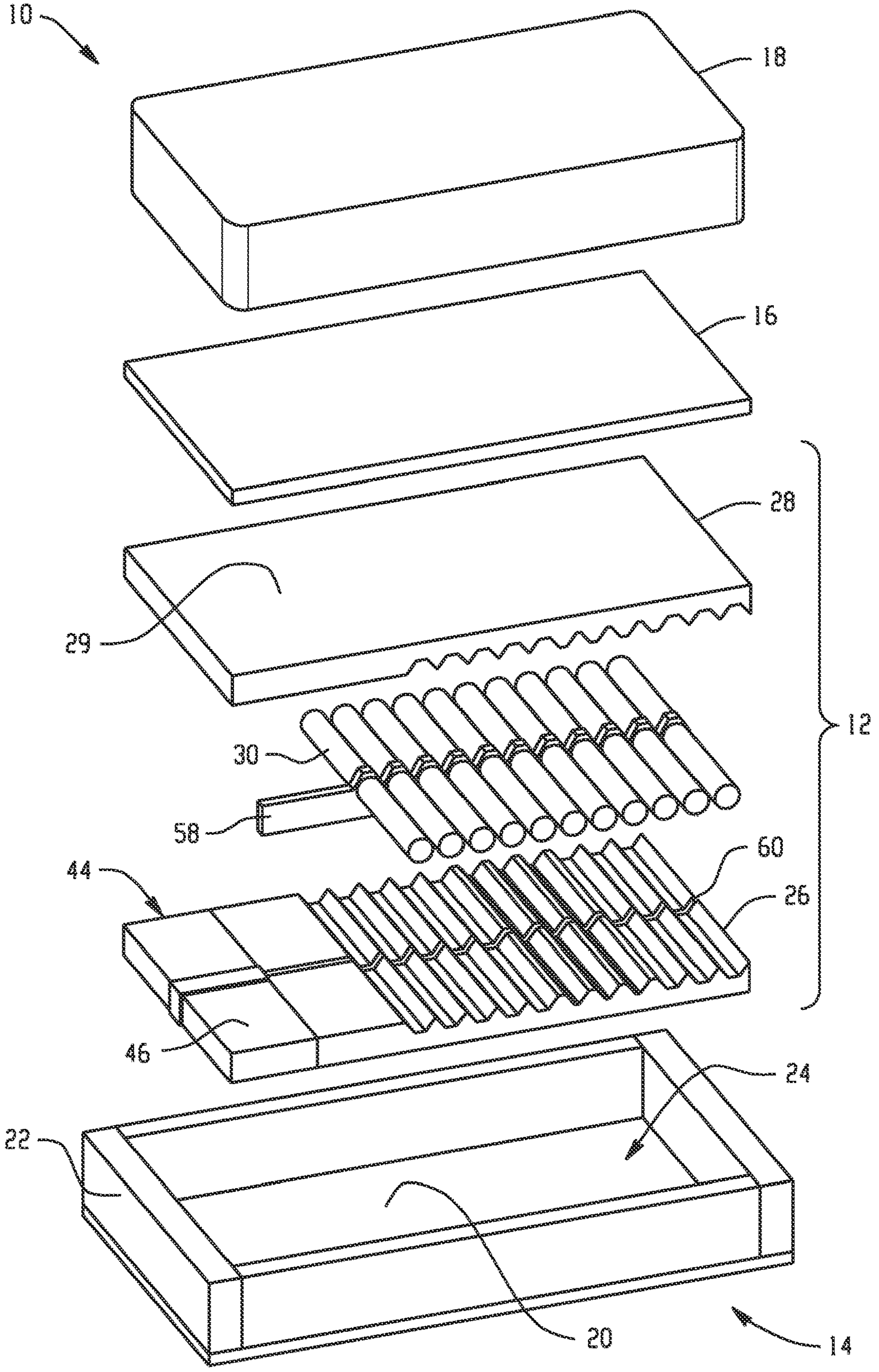
FIG. 1 is an exploded perspective view of an active comfort controlled bedding system configured to provide adjustable firmness in accordance with one or more embodiments.

Referring now to the FIG. 1, there is illustrated an exemplary active comfort controlled bedding system 10 in accordance with one or more embodiments that is configured to provide adjustable firmness including a repeatable pattern to an end user of the bedding system. The bedding system generally includes an innercore unit 12, a foam encased bucket assembly 14, one or more optional comfort layers 16, and a cover 18.

The foam encased bucket assembly 14 includes a planar base layer 20, also referred to as the platform base layer, typically made of foam and dimensioned to approximate the size of the intended mattress. The planar base layer 20 can be formed of a foam material, or it may comprise a wooden, cardboard, or plastic structure selected to support the mattress innercore unit 12. Depending on the properties of the various layers selected in the mattress innercore unit and its inherent stiffness, stiffer or more compliant base layers may be chosen. By way of example, the planar base layer 20 may be a high density polyurethane foam layer (20-170 ILD), or several foam layers (20-170 ILD each), that alone or in combination, provide a density and rigidity suitable for the application.

A side rail assembly 22, which can be manufactured as a single piece or as multiple pieces as is shown, is affixed about the perimeter of the planar base layer 20. The side rail assembly 22 is typically constructed from a dense natural and/or synthetic foam material of the type commonly used in the bedding arts. The foam may be (but is not limited to) polyethylene, latex, polyurethane, or other foam products commonly known and used in the bedding and seating arts and having a suitable density. A typical density is about, but not limited to 1.0 to 3.0 and more typically 1.5 to 1.9 and 20 to 80 ILD, and more typically 35 to 65 ILD. One example of such a foam is the high density polyurethane foam and is commercially available from the FXI, Inc. in Linwood, Ill. Alternatively, any foam having a relatively high indention load deflection (ILD) would be satisfactory for the manufacture of the side rail assembly. Although a specific foam composition is described, those skilled in the art will realize that foam compositions other than one having this specific density and ILD can be used. For example, foams of various types, densities, and ILDs may be desirable in order to provide a range of comfort parameters to the end user.

The size of the side rail assembly 22 can vary according to the application, but each rail typically measures about 2 to about 6 inches (about 5 to about 15 cm) in thickness. The depicted side rails are equal in width, and their length is chosen to correspond to the length of the size of mattress desired. For a regular king size or queen size mattress, the length of rails can be about 78.5 inches (200 cm), although the length can vary to accommodate the width of the header or footer if the header or footer is to extend across the full width of the base platform 20. Similarly, the header/footer piece typically has a thickness of about 2 to about 6 inches (about 5 to 15 cm), and the width is chosen to correspond to the width of the size of mattress desired. In the case of a regular king size mattress the width would be about 74.5 inches (190 cm), and for a queen size mattress, the width would be about 58.5 inches (149 cm), depending on how the foam rails are arranged to form the perimeter sidewall.

The side rail assembly 22 can be mounted or attached to the planar base layer 20 by conventional means, such as (but not limited to) gluing, stapling, heat fusion or welding, or stitching.

The foam encased bucket assembly 14 including the base layer 20 and side rail assembly 22 as constructed defines a well or cavity 24. The well or cavity 24 provides a space in which the innercore unit 12 is inserted.

The innercore unit 12 generally includes at least one set of a plurality of air bladders 30 sandwiched between lower and upper cradle foam layers 26, 28, respectively. The plurality of air bladders 30 can be independent or interconnected and are transversely positioned relative to a longitudinal axis of the bedding system. The plurality of air bladders 30 are seated within openings formed upon mating the lower cradle foam layer 26 to the upper cradle foam layer 28 as will be discussed in greater detail below. As such, the plurality of air bladders 30 are sandwiched between lower and upper cradle foam layers 26, 28, respectively, and are configured to provide auxiliary support in desired locations as will be described in greater detail below. In the illustrated bedding system, the plurality of air bladders 30 are generally positioned at about the head, lumbar, and upper leg or thigh regions. However, it should be apparent that the air bladders can be located at any one or combinations thereof of the foot, head, and lumbar regions as well as portions within the region depending on the intended application.

Figure 2:
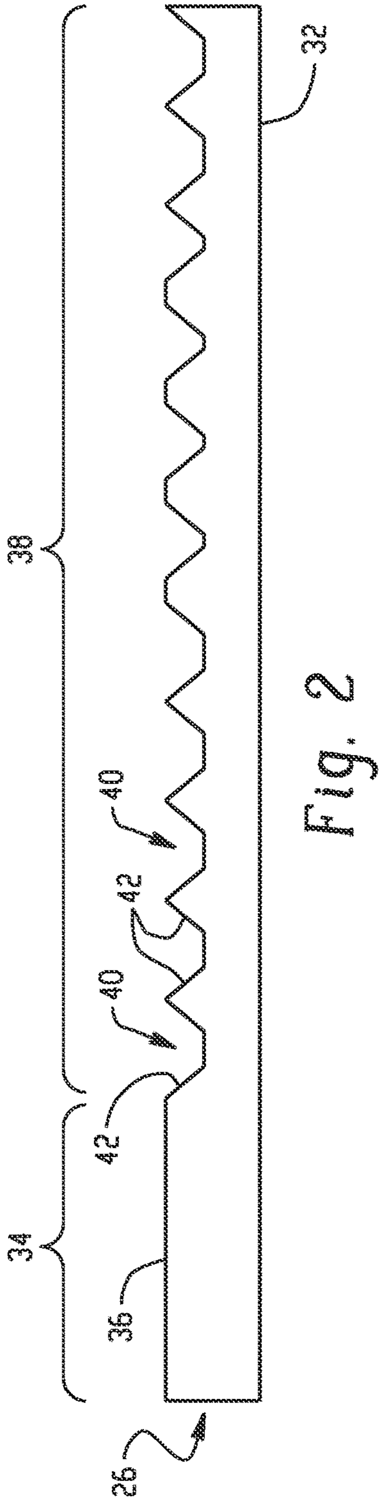
FIG. 2 is a cross sectional view of a lower cradle foam layer in accordance with one or more embodiments for use in the bedding system of FIG. 1.

As shown more clearly in FIG. 2, the lower cradle foam layer 26 includes a planar bottom surface 32 and a top surface including first and second portions 34, 38 respectively. The first portion 34 is optional and includes a planar surface 36 extending from one end to a fraction of the length of the lower cradle foam layer and the second portion 38 includes a plurality of troughs 40 with axial sidewalls 42 extending from the troughs 40. The axial sidewalls 42 extend to about a height of the planar surface 36 of the first portion 34 or less, wherein the depicted troughs generally correspond to about a head, lumbar, and upper leg or thigh regions of a prone user thereon. The spacing between adjacent troughs 40 may be the same or different as may be desired for different applications. The length dimension of the lower cradle foam layer 26 is less than a length dimension in the cavity 24 and the width dimension of the lower cradle foam layer 26 is about equal to the width dimension in the cavity 24. In some embodiments where there is a left and right side such as that conventionally found in queen and king sized bedding systems, the width dimension of the lower cradle foam layer 26 is about one half of the width dimension in the cavity 24. The length dimension of the lower cradle foam layer 26 provides spacing within the cavity 24 to accommodate mechanicals needed for operation of the bed (e.g., pump for bladder pressure or blower for climate control) (not shown), which can be disposed at about the foot region. Fill foam 44 can be used to surround the pump(s) so as to provide sound and vibration insulation and includes a top surface 46 coplanar to the planar surface 36 of the first portion 34 in the lower cradle foam layer 26.

Figure 3:
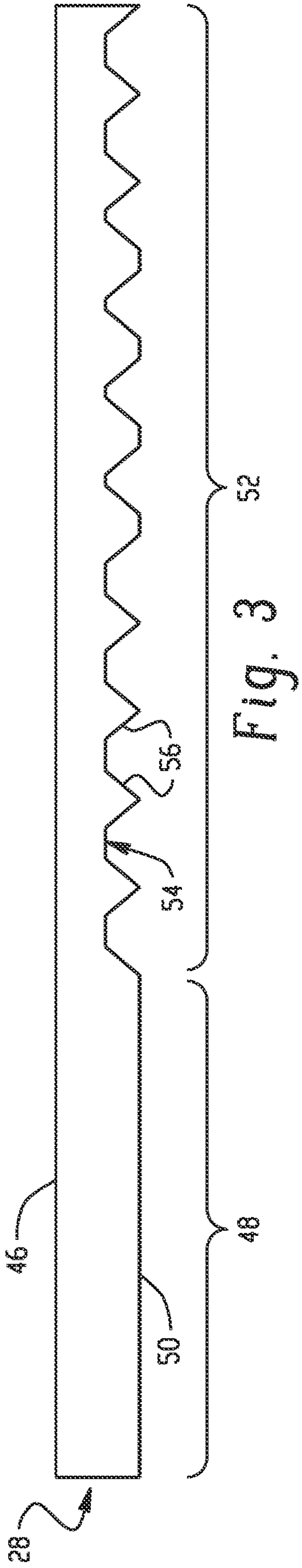
FIG. 3 is a cross sectional view of an upper cradle foam layer in accordance with one or more embodiments for use in the bedding system of FIG. 1.

As shown more clearly in FIG. 3, the upper cradle foam layer 28 includes a planar top surface 29 and a bottom surface configured to face the lower cradle foam layer 26. The bottom surface can include first and second portions 48, 52, respectively. The first portion 48 is optional and has a planar surface 50 extending from one end to a fraction of the length of the upper cradle foam layer and has a second portion 52 including a plurality of troughs 54 with axial sidewalls 56 extending from the trough to about the planar bottom surface 50. The second portion 52 of the upper cradle foam layer 28 can be an approximate mirror image or an exact mirror image of the second portion 38 of the lower cradle foam layer 26 and the respective troughs 54, 40 therein are aligned with each other and are dimensioned to accommodate the plurality of air bladders 30 when the first cradle foam layer 26 is mated to the second cradle foam layer 28. By approximate mirror image, it is meant that the troughs of the upper cradle foam layer 28 could be deeper and/or wider and/or have different angles than the troughs in the lower cradle foam layer (or vice versa), which can be utilized to provide the end user with a different feel. The axial sidewalls 42, 56 of the respective troughs are generally at an angle relative to ground of greater than about 45 degrees to less than about 135 degrees. In the illustrated bedding system 10, the bottom planar surface 50 of the upper cradle foam layer 28 corresponds to the foot region and the troughs correspond to the head, lumbar, and upper leg regions. The upper cradle foam layer 28 has length and width dimensions that generally correspond to the length and width dimensions of the cavity 24. That is, the first portion 50 of the upper cradle foam layer 28, if present, will overlay the first portion 34 of the lower cradle foam layer 26, if present, and the fill foam 44 overlaying the pump(s). In other words, the upper cradle foam layer 28 will have a length dimension that approximates the length dimension of the cavity 24.

The illustrated lower cradle foam layer 26 and upper cradle foam layer 28 are exemplary and not intended to be limited. For example, the troughs as described above can be positioned anywhere along the length of the innercore unit 12 within an area defined by the foot, legs, head and/or lumbar regions. Moreover, the troughs and the axial sidewalls can have an arcuate profile.

The plurality of air bladders 30 are dimensioned to be seated within the troughs and axial sidewalls of the lower and upper cradle foam layers 26, 28, respectively, as shown. The individual air bladders 30 can be fluidly connected to one another and in fluid communication with a pump or can be fluidly connected directly to the pump via a manifold such that pressure within each individual air bladder can be independently controlled or a combination thereof. As such, some of the plurality of air bladders 30 can be fluidly coupled to one another to define a zone whereas the other air bladders can be configured as different zones, wherein pressure within the different zones can be adjusted to provide the bedding system with zones of variable firmness, which can be desirable for supporting different portions of the body for the end user.

A pump (not shown) can be provided within the fill foam layer 44 shown in FIG. 1 and can be provided with a pneumatic line to selectively regulate and adjust pressure in one or more of the air bladders 30 as desired. An operable valve such as a pressure relief valve, electronically actuated valve, or the like can be inline and/or at the inlets and/or outlets to the air bladders 30 to permit selective inflation and exhaustion of air to/from air bladders to adjust the internal pressure and locally adjust firmness levels in the bedding system. The air bladders themselves can include interconnecting internal or external fluid passageways so as to adjust the pressure therein.

A control unit (not shown) is electronically connected to the pump as well as the actuated valves and can be programmed to adjust the pressures within the air bladders 30 as desired. The control unit includes control circuitry that generates signals to control the inflation and deflation of one or more air bladders 30, which can include a plug that coupled to an electrical outlet (not shown) to receive local power, which in the United States could be standard 110 V, 60 Hz AC electric power supplied through a power cord. It should be understood that alternate voltage and frequency power sources may also be used depending upon where the product is sold and the local standards used therein. Control circuitry further includes power circuitry that converts the supplied AC power to power suitable for operating various circuit components of control circuitry.

Figure 4:
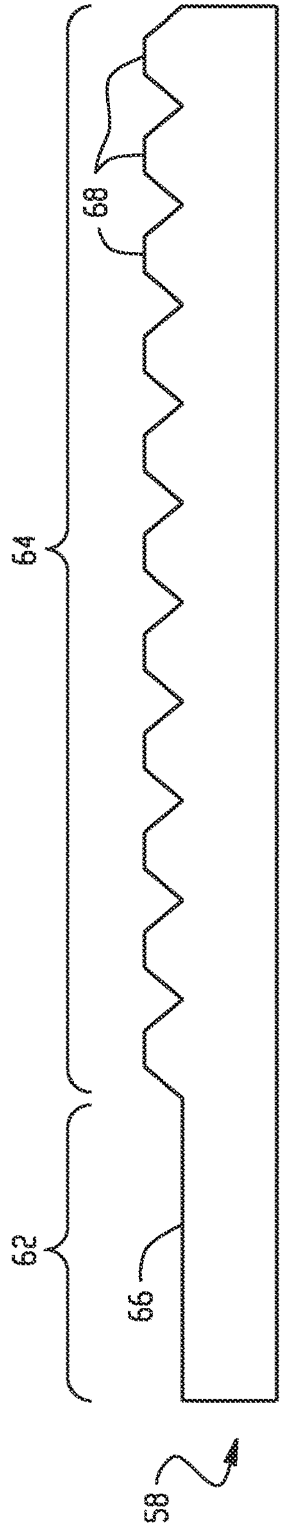
FIG. 4 is a cross sectional view of a divider in accordance with one or more embodiments for use in a multi-user bedding system.

The illustrated bed system of FIG. 1 can be dimensioned to accommodate two end users. In embodiments such as these that are configured for multiple users, the bedding system can further include an optional divider 58 bisecting the width dimension of the bedding system and disposed in a gap 60 provided between two lower cradle foam layers 26. As shown in FIG. 4, the divider 58 can span the length of the lower cradle foam layer 26 and includes an optional first portion 62 and a second portion 64. The optional first portion 62 includes a planar top surface 66 and has a height equal to the first portion 34 of the lower cradle foam layer 26 when present such that the planar top surface 66 is coplanar to the planar top surface 36 of the lower cradle foam layer 26. The second portion 64 includes a plurality of protrusions 68 extending above a plane defined by the top planar surface 66 of the first portion 62. The protrusions 68 have a shape complementary to the troughs and axial sidewalls provided in the second portion 52 of the upper cradle foam layer 28 and are seated therein when the bedding system is assembled. The height dimension of the divider 58 is substantially equal to the height provided when the lower and upper cradle foam layers 26, 28, respectively, are stackedly arranged in the manner shown in FIG. 1

The divider 58 separates the bedding system into two sleeping surfaces, i.e., a left side and a right side such as that conventionally found in queen and king sized bedding systems. As such, two different sets of air bladders can be used for each side as shown; one for each user, which permits firmness adjustment tailored to the particular end user's desires for that side. Moreover, the presence of the divider 58 decreases center drop off should an end user move towards the center of the bedding system. Additionally, the divider 58 reduces noise from the air bladders during use, among other benefits.

The one or more uppermost comfort layers 16 is a foam layer and has a thickness of about 0.5 to 3 inches in most embodiments, although greater or less thickness could be used. One or more layers can be used to define the comfort layer, which generally has top and bottom planar surfaces. The comfort layer has length and width dimensions similar to that of the platform base layer 20 and overlays the innercore unit 12 and the side rails 22 of the bucket assembly 14. In one or more embodiments, the uppermost comfort layer is a thermally conductive gel infused foam or other thermally conductive material infused foam. By way of example, the thermally conductive gel infused foam can be a polyurethane gel foam infused with LumaGel™ microparticles commercially available through Peterson Chemical Technology, LLC.

The cover 18 can be a zippered cover, quilt layer, and/or the like and is generally configured to encapsulate the bucket assembly 14, the innercore unit 12, and comfort layer 16.

In one or more embodiments, the control unit is programmed to selectively inflate the air bladders via the pump in a repeating pattern to provide the end user with a massaging action, a therapeutic benefit, or the like. In these embodiments, each one of the air bladders further includes a pressure sensor for sensing pressure within each of the air bladders, which can then be used by the controller to provide a repeatable pressure change in selected air bladders via the pump. The repeatable pressure change can be made to occur in selected air bladders such as, for example, in response to an applied load detected by two or more particular air bladders such as from a prone end user. This will decrease the volume of the air in the air bladder, and the pressure will increase (by Boyle's law) as a function of the applied load. The increase in pressure as a function of applied load can be detected by the pressure sensors and a repeating pressure pattern can be then made to those air bladders such that the prone end user experiences a massaging action, a therapeutic benefit or the like. The repeating pressure pattern generally includes sequentially inflating or deflating different air bladders. By way of example, the repeating pattern can include a wave pattern by selectively sequentially inflating and deflating the air bladders in order followed by repetition of the wave pattern. However, it should be noted that any repeating pressure pattern can be programmed. It should also be noted that the repeating pattern can include simultaneously increasing the pressure of 2 or more air bladders followed by release of the excess pressure and increasing the pressure of one or more of the other air bladders in a repetitive pattern.

By way of example, the nominal air pressure (no load) within an air bladder for some air comfort bedding systems can be about 1.5 pounds per square inch (psi). An increase of about 0.1 psi or more can be sequentially provided to selected air bladders in a repeating pattern and readily sensed by the end user to provide a massaging or therapeutic action.

In one or more embodiments, the control unit can configure the initial/nominal pressure within the air bladders differently depending on the location and extent of the applied load. For example, the initial/nominal pressure can be different for air bladders corresponding to the leg and foot regions relative to the air bladders corresponding to the seat region. The air bladder pressure in the leg and foot regions can be less than that for the air bladders in the seat region, wherein the air bladders in the seat region typically bear a greater applied load when a prone user is situated thereon compared to the air bladders in the leg and foot region. Otherwise, the prone user could experience "sinking" in the seat region. Once an initial pressure is determined for the different air bladders in the various regions of the mattress, the control unit can be configured to increase/decrease the pressure sequentially within selected air bladders in a repeating pattern so as to provide the massage action or therapeutic action, or the like.

Figure 5:
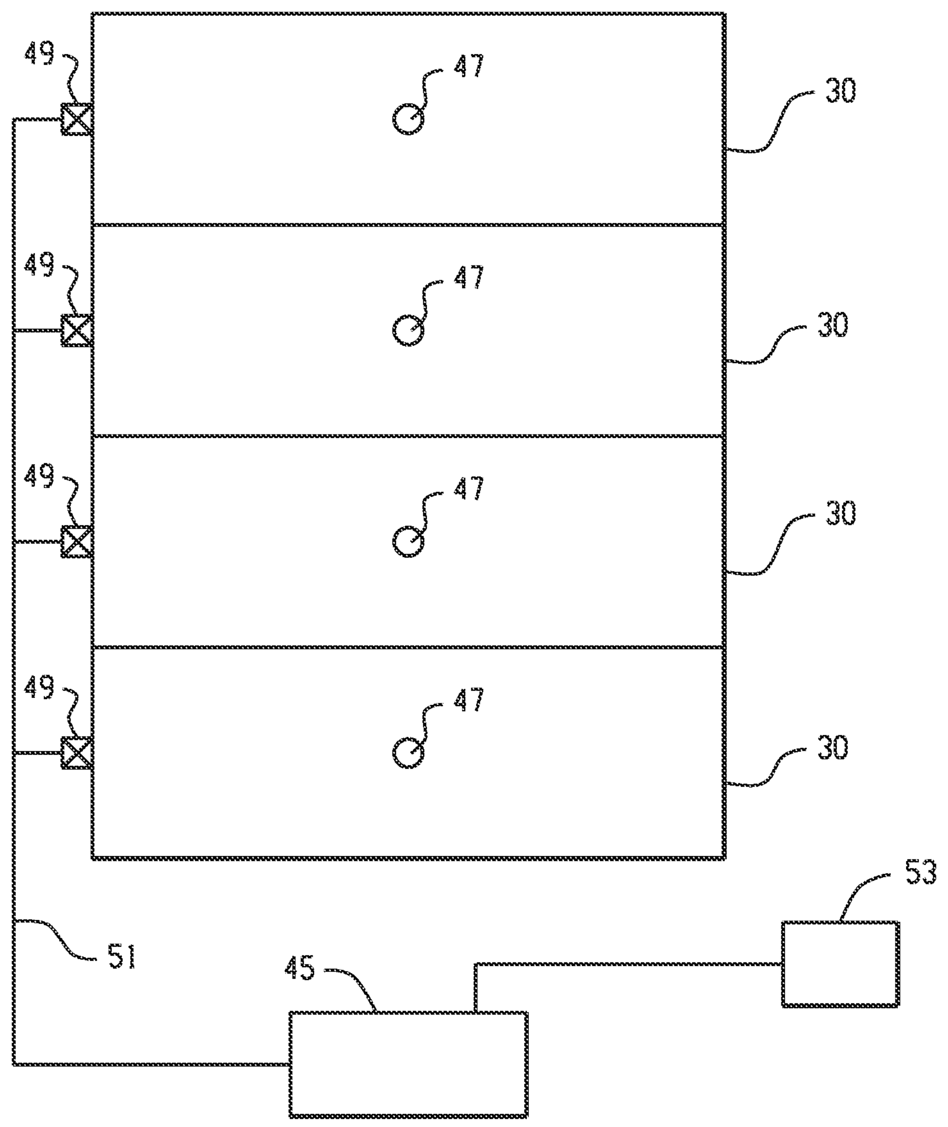
FIG. 5 is a top down view of an array of air bladders suitable for use in the active comfort bedding system in accordance with one or more embodiments.

Turning now to FIG. 5, there is shown a top down view depicting a portion of the of the air bladders 30 depicted in FIG. 1 As noted above, a pump 45 may be provided within the fill foam layer 44 (see FIG. 1) to selectively inflate the air bladders 30 in a repeating pattern. Each air bladder 30 includes a pressure sensor 47 for determining the air pressure within the respective air bladder 30. The pump 45 is in fluid communication with the air bladders 30 via a manifold 51. An operable valve 49 such as a pressure relief valve, electronically actuated valve, or the like can be inline and/or at the inlets and/or outlets to the air bladders 30 to permit selective inflation and exhaustion of air to/from air bladders to adjust the internal pressure and locally adjust firmness levels. Selective opening and closing of the valves 49 can be controlled by the control unit 53, which also is configured to selectively activate the pump 45. In this manner, a selected one of the air bladders 30 can be inflated for a period of time before the next air bladder is inflated. The control unit 53 is configured to provide a repeating pattern. For example, the repeating pattern may include sequentially inflating two or more air bladders corresponding to the head and back region of the mattress. The repeating pattern may be a wave pattern however, it should be apparent that other patterns can be programmed in the control unit 53.

The pump 45 can be bidirectional in terms of air flow so as to exhaust the volume of air that was previously added to a selected air bladder 30 to increase the pressure. In one or more other embodiments, the manifold 51 can be configured to selectively provide negative air flow to the particular air bladder to deflate the air bladder to the predetermined pressure. In one or more embodiments, the volume of air exhausted is the same as the volume of air admitted to increase the pressure. In one or more other embodiments, the volume of air exhausted is the greater than the volume of air admitted to increase the pressure so as to provide greater sensation to the end user. Once exhausted, the pressure can be increased back to the initial loaded pressure. In still one or more other embodiments, each air bladder can be configured with an exhaust valve.

Figure 6:
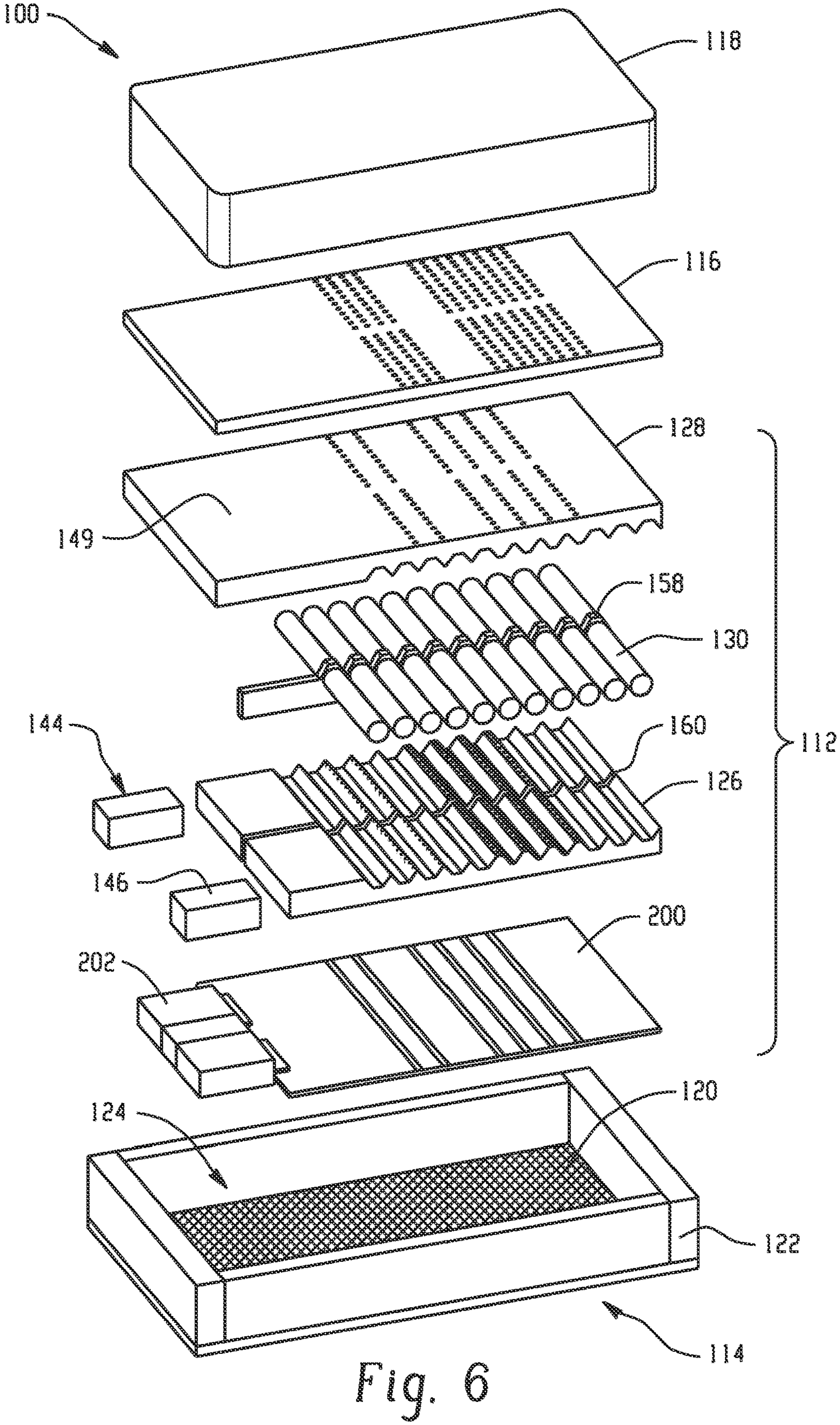
FIG. 6 is an exploded perspective views of an active comfort controlled bedding system configured to provide adjustable firmness and climate adjustment in accordance with one or more embodiments.
Figure 7:
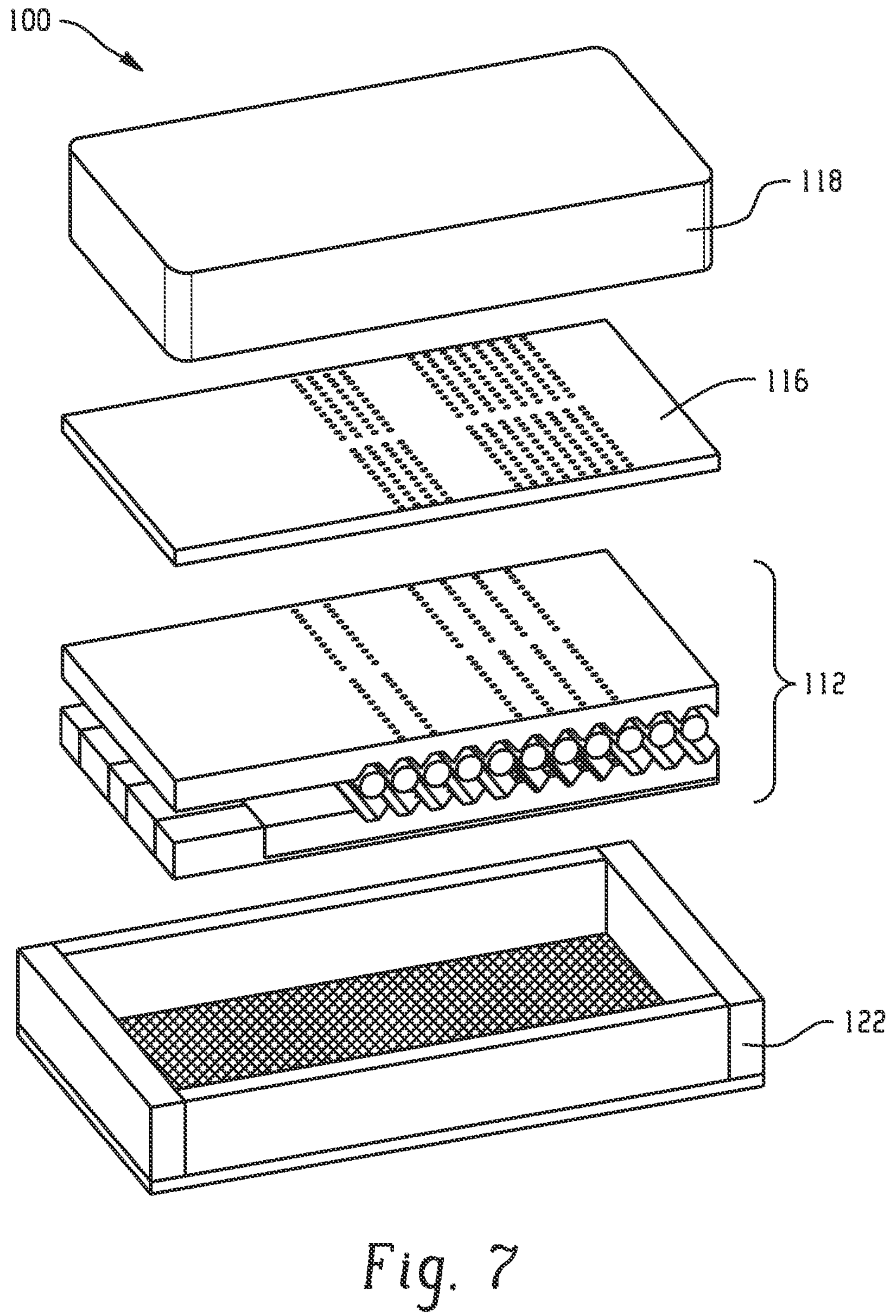
FIG. 7 is also an exploded perspective views of an active comfort controlled bedding system configured to provide adjustable firmness and climate adjustment in accordance with one or more embodiments.

Turning now to FIGS. 6-7, there is depicted an active comfort controlled bedding system 100 in accordance with one or more embodiments that includes variable firmness control and variable climate control. The bedding system generally includes an innercore unit 112, a foam encased bucket assembly 114, an optional comfort layer 116, and a cover 118.

The foam encased bucket assembly 114 includes a breathable material layer 120 such as a spacer fabric, an extruded three-dimensional fiber assembly, high air flow foam such as open cell and reticulated foams, or the like and is dimensioned to approximate the length and width dimensions of the intended mattress. In other embodiments, local perforations of a less air permeable foam can be used. By way of example, an extruded three-dimensional fiber assembly can be configured to provide high air permeability and sufficient compression strength to support the innercore unit 112, the optional comfort layer 116, the cover 118, and end user when in use. Additionally, the breathable material layer 120 can be fabricated from or treated with fire retardant materials. Likewise, the various layers can be treated with antimicrobials. The thickness of the breathable material layer 120 is not intended to be limited and can generally range from about 0.5 inches to about 3 inches. In another embodiment, an alternative surface/layer can be configured for air intake such as one or more of the side rails. In this embodiment, the base layer can be a conventional foam layer.

A side rail assembly 122, which can be manufactured as a single piece or as multiple pieces, is affixed about the perimeter of the spacer fabric base layer 120. The side rail assembly 122 can be constructed from a dense natural and/or synthetic foam material of the type commonly used in the bedding arts. The foam may be (but is not limited to) polyethylene, latex, polyurethane, or other foam products commonly known and used in the bedding and seating arts and having a suitable density. A typical density is about, but not limited to 1.0 to 3.0 and more typically 1.5 to 1.9, and 20 to 80 ILD, and more typically 35 to 65 ILD. One example of such a foam is a high-density polyurethane foam and is commercially available from the FXI, Inc. in Linwood, Ill. Alternatively, any foam having a relatively high indention load deflection (ILD) would be satisfactory for the manufacture of the side rail assembly. Although a specific foam composition is described, those skilled in the art will realize that foam compositions other than one having this specific density and ILD can be used. For example, foams of various types, densities, and ILDs may be desirable in order to provide a range of comfort parameters to the end user.

The size of the side rail assembly 122 can vary according to the application, but each rail typically measures about 2 to about 6 inches (about 5 to about 15 cm) in thickness. The depicted side rails are equal in width, and their length is chosen to correspond to the length of the size of mattress desired. For a regular king size or queen size mattress, the length of rails can be about 78.5 inches (200 cm), although the length can vary to accommodate the width of the header or footer, it the header or footer is to extend across the full width of the spacer fabric base layer 120. Similarly, the header/footer piece typically has a thickness of about 2 to about 6 inches (about 5 to about 15 cm), and the width is chosen to correspond to the width of the size of mattress desired. In the case of a regular king size mattress, the width would be about 74.5 inches (190 cm), and for a queen size mattress, the width would be about 58.5 inches (149 cm), depending on how the foam rails are arranged to form the perimeter sidewall.

The side rail assembly 122 can be mounted or attached to the breathable material base layer 120 by conventional means, such as (but not limited to) gluing, stapling, heat fusion or welding, or stitching.

The foam encased bucket assembly 114 including the breathable material base layer 120 and side rail assembly 122 as constructed defines a well or cavity 124. The well or cavity 124 provides a space in which the innercore unit 112 is inserted.

The innercore unit 112 generally includes a plurality of air bladders 130 sandwiched between lower and upper cradle foam layers 126, 128, respectively, a flow distribution member 200, an air blower and pump assembly shown generally at 202, and fill foam 144 provided within any voids, wherein the air blower assembly 202 is fluidly coupled to the flow distribution member 200 and the pump is fluidly coupled to the air bladders 130. The plurality of air bladders 130 are transversely positioned relative to a longitudinal axis of the bedding system as previously described and seated within openings formed upon mating the lower cradle foam layer 126 to the upper cradle foam layer 128. As such, the plurality of interconnected air bladders 130 are sandwiched between lower and upper cradle foam layers 126, 128, respectively, and are configured to provide auxiliary support in desired locations such as head, foot and torso (i.e., lumbar), and/or upper leg regions.

The air comfort bedding system 100 like the air comfort bedding system 10 described above can be configured with a control unit programmed to selectively inflate the air bladders via the pump in a repeating pattern to provide the end user with a massaging action, a therapeutic benefit, or the like. In these embodiments, each one of the air bladders further includes a pressure sensor for sensing pressure within each of the air bladders, which can then be used by the controller to provide a repeatable pressure change in selected air bladders via the pump as previously described.

Figure 8:
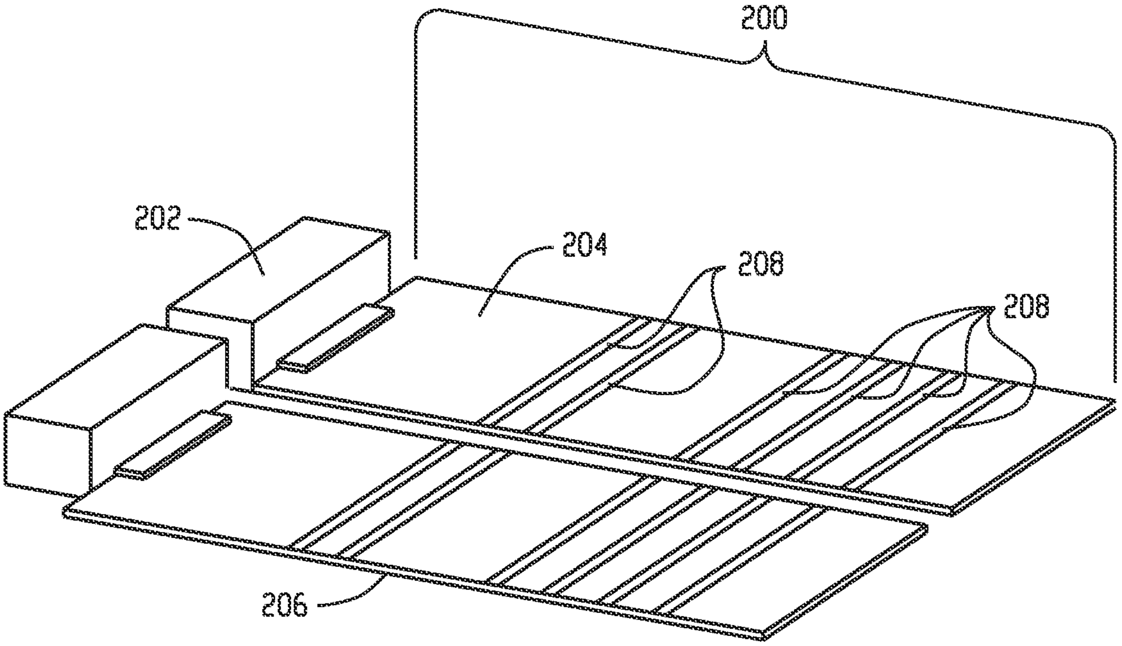
FIG. 8 is a perspective view of a flow distribution member and air blower assembly in accordance with one or more embodiments for providing air flow in the bedding system of FIGS. 6-7.

Referring now to FIG. 8, there is depicted the fluid distribution member 200 including the air blower 202 assembly. The fluid distribution member 200 itself has a length less than a length of the cavity 124 so as to accommodate the air blower assembly 202 (and pump for firmness control). The fluid distribution member 200 includes top and bottom planar surfaces 204, 206, respectively and can be formed of a highly porous material such as a spacer fabric, super strand, open cell high air flow foam, or the like. The air blower assembly 202 includes a plenum fluidly connected to a sidewall of the fluid distribution member for discharging air directly into the fluid distribution member 200. The bottom planar surface 206 can include an outer sheathing material thereon that is impervious to air flow though the bottom planar surface. The top planar surface 204 is substantially impervious to air flow but includes a plurality of spaced apart air flow permeable strips 208 (or openings) extending from side to side, i.e., transverse to the longitudinal axis of the bedding system. In one or more embodiments, the air flow permeable strips 208 are positioned under the head, neck, lumbar, and/or leg regions, and as will be discussed in greater detail below, will direct the air flow to the head, neck, lumbar, and leg regions. The air flow permeable strips 208 can be formed in an impervious sheathing material applied to the top planar surface 204 of the fluid distribution member and can include a plurality of openings formed within the sheathing material to permit directed fluid flow from the air blower 202 through the air permeable strips 208 when in use. In operation, the air blower 202 will draw air in though the breathable material base layer 120 to the air permeable strips 208. In one or more embodiments, the permeability of the strips relative to one another can be manipulated to achieve a desired flow discharge profile along the layer. Alternatively, a non-air permeable core can be used in the plenum layer where the sheathing fits loosely enough to allow air to move fluidly between the core and the sheath material. The purpose of the core is to prevent the sheathing from collapsing and sealing against itself. Additionally, the air impermeable core can have convolutions formed in one or more surfaces to create air channels to distribute air efficiently down the layer. For multi-user bedding systems such as the one depicted, there can be two fluid distribution members abutting one another to provide air flow to the right and left sides of the bedding system or a single fluid distribution member can be utilized with an impermeable barrier layer bisecting the right and left sides. The flow of air can be programmed to the particular user of the left or right side of the bedding system.

The air blower assembly 202 can include a fluid transfer device (e.g., blower, fan, etc.), a thermoelectric device (e.g., Peltier device), a convective heater, a heat pump, a dehumidifier and/or any other type of conditioning device. In one or more embodiments, an optional filter assembly (not shown) can be between the air supply inlets and outlets e.g., between the spacer fabric and blower, to remove contaminants in the air. In one or more embodiments, the circulated air is ambient air.

The optional filter assembly generally includes a filter seated within a filter housing. Suitable filter materials are not intended to be limited and may include foam, or woven and/or non-woven materials, pleated or unpleated materials composed of fiberglass, cotton or synthetic fibers. Likewise, the shape of the filter is not intended to be limited. Exemplary shapes include cartridge filters, cone filters, planar filters, and the like.

In still other embodiments, the filter may be scented. For example, fragrance pads may be integrated into the filter or positioned in close proximity to the filter. Similarly, the filter may include an activated carbon treatment for absorbing odors and may further include an antimicrobial coating.

Figure 9:
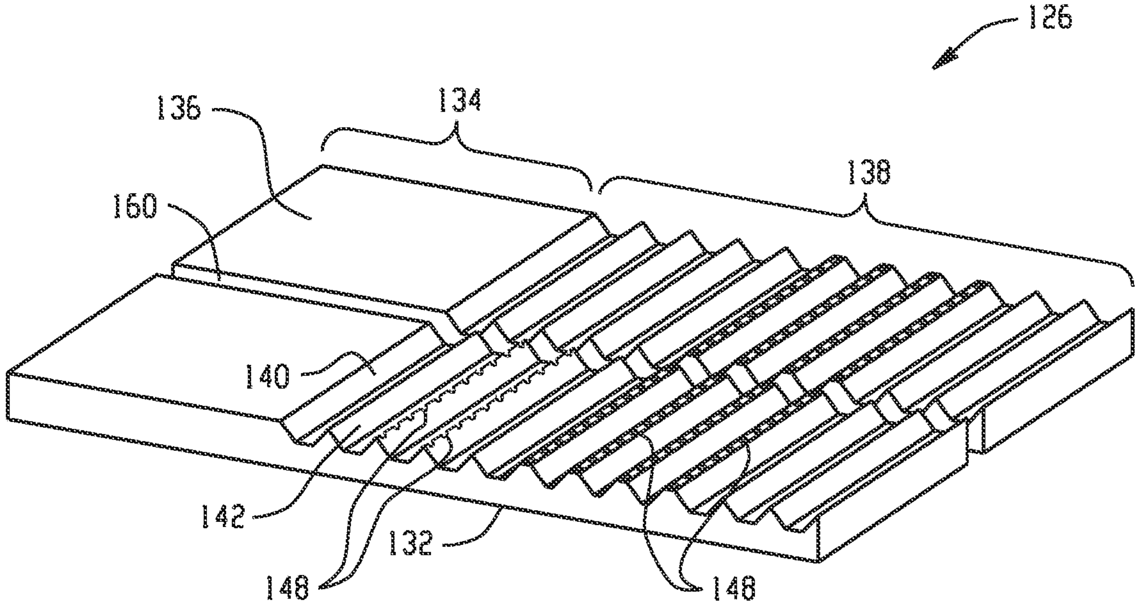
FIG. 9 is a perspective view of a lower cradle foam layer in accordance with one or more embodiments for the bedding system of FIGS. 6-7.

As shown more clearly in FIG. 9, the lower cradle foam layer 126 includes a planar bottom surface 132 and a top surface including first and second portions 134, 138, respectively. The first portion 134 is optional and can have a planar surface 136. The second portion 138 includes a plurality of troughs 140 with axial sidewalls 142 extending from the troughs to about a height of the planar surface 136 of the first portion 134 or more if the optional first portion is present. The spacing between adjacent troughs 140 may be the same or different as may be desired for different applications. The length dimension of the illustrated lower cradle foam layer 126 is less than a length dimension in the cavity, wherein the depicted troughs generally correspond to about a head, lumbar, and upper leg regions of a prone user thereon. The length dimension of the lower cradle foam layer 126 provides spacing within the cavity 124 to accommodate an air powered pump(s) and blower(s), which can be disposed at about the foot region, i.e., approximates the length of the fluid distribution layer 200. Fill foam 144 is provided in voids and can be configured to surround the pump(s) and blower(s) so as to provide sound insulation. The fill foam 144 includes a top surface 146 coplanar to the planar surface 136 of the first portion 134 in the lower cradle foam layer 126.

Additionally, the lower cradle foam layer 126 includes openings 148 in selected rows defined by the troughs and axial sidewalls. The openings 148 are vertically oriented channels and extend from the bottom surface to the top surface at an apex defined by the convergence of the axial sidewalls. The openings 148 are substantially aligned and in fluid communication with the spaced apart air flow permeable strips 208. In one or more embodiments, the openings 148 and the air flow permeable strips 208 correspond to the head, neck, lumbar, and/or leg regions.

Figure 10:
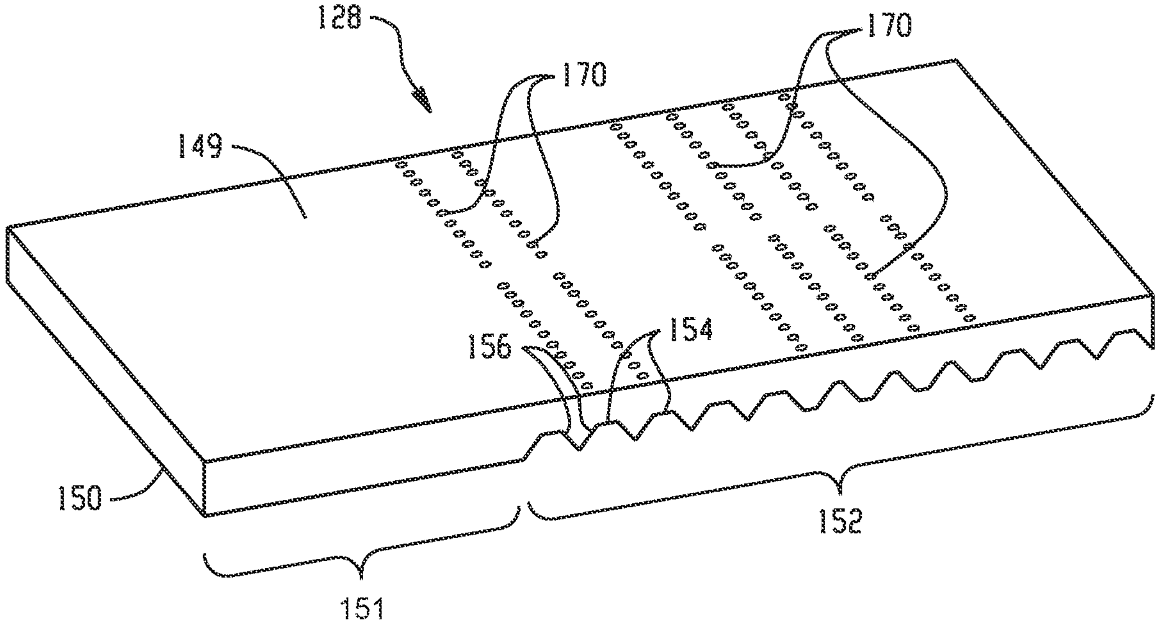
FIG. 10 is a perspective view of an upper cradle foam layer in accordance with one or more embodiments for the bedding system of FIGS. 6-7.

As shown more clearly in FIG. 10, the upper cradle foam layer 128 includes a planar top surface 149 and a bottom surface facing the lower cradle foam layer 126. The bottom surface includes a first portion 148 having a planar bottom surface 150 and a second portion 152 including a plurality of troughs 154 with axial sidewalls 156 extending from the trough to about the height of the bottom planar surface 150 of the first portion 148 or less. The second portion 152 of the upper cradle foam layer 128 is an approximate mirror image or mirror image of the second portion 138 of the lower cradle foam layer 126 as previously described and the respective troughs 154, 140 therein are aligned with each other and are dimensioned to accommodate the plurality of air bladders 130. The axial sidewalls 142, 156 are generally at an angle relative to the top planar surface of greater than about 45 degrees to about 135 degrees. In the illustrated bedding system 100, the first portion 148 of the upper cradle foam layer 128 generally corresponds to the foot region and the second portion 152 generally corresponds to the head, lumbar, and upper leg regions. The upper cradle foam layer 128 has length and width dimensions that generally correspond to the length and width dimensions of the cavity 124. That is, when assembled the first portion 148 of the upper cradle foam layer 128 will overlay the first portion 134 of the lower cradle foam layer 126, the fill foam 144, and the pump(s) and blower(s).

The upper cradle foam layer 128 further includes a plurality of openings 170 in selected rows defined by the troughs and axial sidewalls. The openings 170 extend to the planar top surface 149 to an apex defined by the convergence of the axial sidewalls 156 of adjacent troughs 154. The openings 170 are substantially aligned with and in fluid communication with the spaced apart air flow permeable strips 208 and the openings 148 in the lower cradle foam layer 126. In one or more embodiments, the flow path as defined generally corresponds to the head, lumbar, and/or upper leg regions.

The illustrated lower cradle foam layer 126 and upper cradle foam layer 128 are exemplary and not intended to be limited. For example, the troughs as described above can be positioned along the length of the innercore unit such as, for example, within an area defined by the lumbar region and not the head region. Moreover, the troughs and the axial sidewalls can have an arcuate profile. Still further, the first portions of each respective cradle foam layer are optional. Any voids can be filled with fill foam 144.

The plurality of air bladders 130 are dimensioned to be seated within the troughs and axial sidewalls of the lower and upper cradle foam layers 126, 128, respectively, as shown in FIGS. 6-7. Sufficient spacing is provided between air bladders to permit flow of air there between. The individual air bladders 130 can be fluidly connected to one another and in fluid communication with the pump or can be fluidly connected to the pump via a manifold such that pressure within each individual air bladder can be independently controlled. Likewise, some of the plurality of air bladders 130 can be fluidly coupled to one another to define a firmness adjustable zone having a defined pressure whereas the other air bladders can be configured as one or more firmness adjustable different zones, which can be desirable for supporting different parts of the end user where different pressures may be desired for maximum comfort.

A pump is provided with a pneumatic line to individually or collectively inflate or deflate the plurality of air bladders 130 as desired, e.g., a repeating pattern as described above. An operable valve such as a pressure relief valve in the line and/or at the inlets to the air bladders permits selective exhaustion of air from mattress 130 to adjust the mattress to the desired firmness. Exemplary air supplies and pneumatic pumps are disclosed in U.S. Pat. Nos. 8,181,290; 8,191,187; 8,065,763; 7,996,936; and 7,877,827; and US Pat. Pub. Nos. 2012/0227182; 2012/0131748; 2011/0296611; 2011/0258778; 2011/0119826; 2010/0011502; and 2008/0148481; incorporated by reference in their entireties.

A control unit (not shown) is electronically connected to the pumps and blowers as well as the various valves in the event the valves are operably adjustable, and programmed to adjust the pressures of the air bladders 130 and regulate fluid flow as desired. The control unit includes control circuitry that generates signals to control the inflation and deflation of one or more air bladders 130 and fluid flow. Control circuitry includes a plug that couples to an electrical outlet (not shown) to receive a local power source, e.g., in the United States, a typical power source is 110 V, 60 Hz AC electric power, which is supplied through a power cord to the other components of control circuitry including the pump. It should be understood that alternate voltage and frequency power sources may also be used depending upon where the product is sold and the local standards used therein. Control circuitry further includes power circuitry that converts the supplied AC power to power suitable for operating various circuit components of control circuitry.

The illustrated bed system of FIGS. 6-7 is dimensioned to accommodate two end users. In embodiments such as these that are configured for multiple users, the bedding system can further include a divider 158 as shown in FIG. 6 bisecting the width dimension of the bedding system 100 and disposed in a channel 160 as shown in FIG. 6 provided in the lower cradle foam layer 126. Alternatively, the lower cradle foam layer 126 can be composed of two separate halves, wherein the divider 158 is intermediate the two halves. The divider 158 can span the length of the lower cradle foam layer 126 and includes an optional first portion and a second portion as generally shown and described in reference to FIG. 4. That is, the first portion includes a planar top surface and has a height equal to the first portion of the lower cradle foam layer 126 such that the planar top surface is coplanar to the planar top surface 136 of the lower cradle foam layer 126. The second portion includes a plurality of protrusions extending above a plane defined by the top planar surface of the first portion. The protrusions have a shape complementary to the troughs and axial sidewalls provided in the upper cradle foam layer 128 and are seated therein when the bedding system is assembled.

The divider 158 separates the bedding system into two sleeping surfaces, i.e., a left side and a right side such as that conventionally found in queen and king sized bedding systems. Two different sets of air bladders can be used for each side; one for each user, which permits firmness adjustment as well as air flow adjustment tailored to the particular end user's desires for that side. Moreover, the presence of the divider 158 decreases center drop off as an end user should he/she move towards the center of the bedding system. Additionally, the divider 158 reduces noise from the air bladders during use. In one or more embodiments, the divider can be shaped such that the top edge interlocks with the troughs on the upper cradle layer. This interlocking can better stabilize the component of the bed and to blend the sides together to create less of a defined drop-off or transition between sides.

Figure 11:
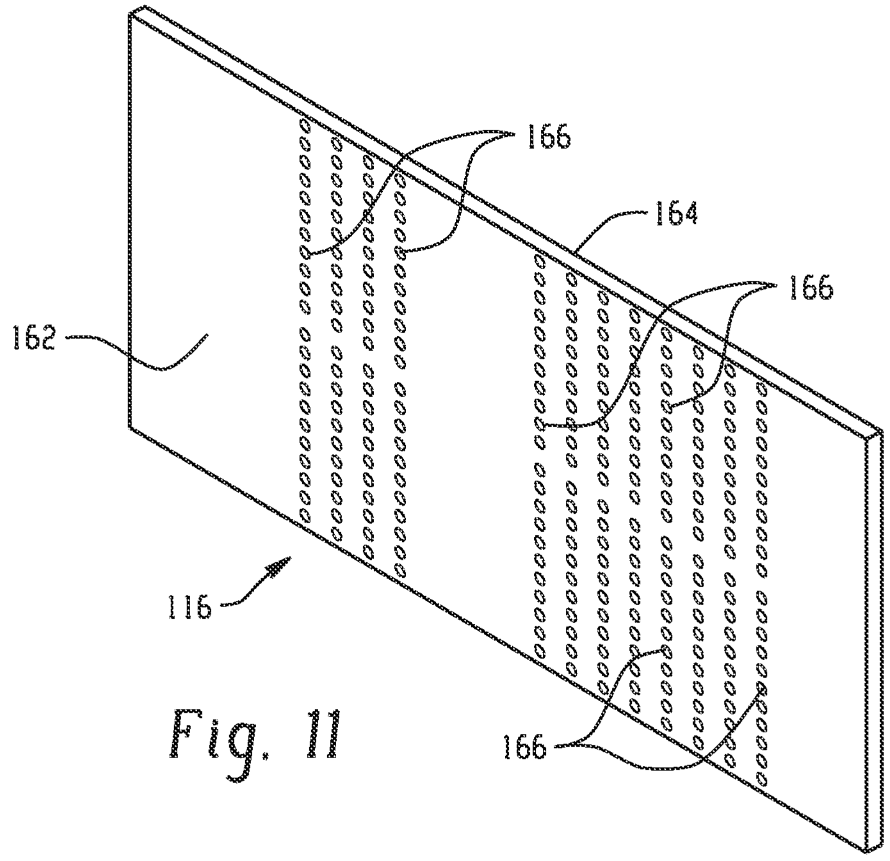
FIG. 11 is a perspective view of comfort layer in accordance with one or more embodiments for the bedding system of FIGS. 6-7.

Referring now to FIG. 11, the comfort layer 116 is a foam layer and overlays the top planar surface 149 of the upper cradle foam layer 128. The comfort layer 116 includes top and bottom planar surfaces 162, 164, respectively. An array of perforations 166 are formed at about the head, lumbar, and/or upper leg regions depending on the intended application, which are generally aligned with the openings 170 in the upper cradle layer 128 and the openings 148 in the lower cradle foam layer 126. The size, spacing, and pattern of perforations is such that even with the relatively random placement relative to the corresponding holes in the cradle layer, a generally consistent total area of overlap between the two features is obtained. The comfort layer 116 can have a thickness of about 0.5 to 3 inches in most embodiments, although greater or less thickness could be used. Still further, the comfort layer 116 can be defined by multiple layers, wherein the layers can have different properties and dimensions.

Suitable foams for the different layers including the comfort layer 116 that include foam, include but are not limited to, polyurethane foams, latex foams including natural, blended and synthetic latex foams; polystyrene foams, polyethylene foams, polypropylene foam, polyether-polyurethane foams, and the like. Likewise, the foam can be selected to be viscoelastic or non-viscoelastic foams. Some viscoelastic materials are also temperature sensitive, thereby also enabling the foam layer to change hardness/firmness based in part upon the temperature of the supported part. Unless otherwise noted, any of these foams may be open celled or closed cell or a hybrid structure of open cell and closed cell. Likewise, the foams can be reticulated, partially reticulated or non-reticulated foams. The term reticulation generally refers to removal of cell membranes to create an open cell structure that is open to air and moisture flow. Still further, the foams may be gel infused, include conductive materials, include phase change materials, or other additive in some embodiments. The different layers can be formed of the same material configured with different properties or different materials.

The various foams suitable for use in the foam layer may be produced according to methods known to persons ordinarily skilled in the art. For example, polyurethane foams are typically prepared by reacting a polyol with a polyisocyanate in the presence of a catalyst, a blowing agent, one or more foam stabilizers or surfactants and other foaming aids. The gas generated during polymerization causes foaming of the reaction mixture to form a cellular or foam structure. Latex foams are typically manufactured by the well-known Dunlap or Talalay processes. Manufacturing of the different foams are well within the skill of those in the art.

The different properties for each layer defining the foam may include, but are not limited to, density, hardness, thickness, support factor, flex fatigue, air flow, glass transition temperature, various combinations thereof, and the like. Density is a measurement of the mass per unit volume and is commonly expressed in pounds per cubic foot. By way of example, the density of the each of the foam layers can vary. In some embodiments, the density decreases from the lower most individual layer to the uppermost layer. In other embodiments, the density increases. In still other embodiments, one or more of the foam layer can have a convoluted surface. The convolution may be formed of one or more individual layers with the foam layer, wherein the density is varied from one layer to the next. The hardness properties of foam are also referred to as the indention load deflection (ILD) or indention force deflection (IFD) and is measured in accordance with ASTM D-3574. Like the density property, the hardness properties can be varied in a similar manner. Moreover, combinations of properties may be varied for each individual layer. The individual layers can also be of the same thickness or may have different thicknesses as may be desired to provide different tactile responses.

The hardness of the layers generally has an indention load deflection (ILD) of 7 to 16 pounds x force for viscoelastic foams and an ILD of 7 to 45 pounds x force for non-viscoelastic foams. ILD can be measured in accordance with ASTM D 3574. The density of the layers can generally range from about 1 to 2.5 pounds per cubic foot for non-viscoelastic foams and 1.5 to 6 pounds per cubic foot for viscoelastic foams.

The cover 118 can be a zippered cover, quilt layer, or similar construction and is generally configured to encapsulate the bucket assembly, the innercore unit, and comfort layer.

Figure 12:
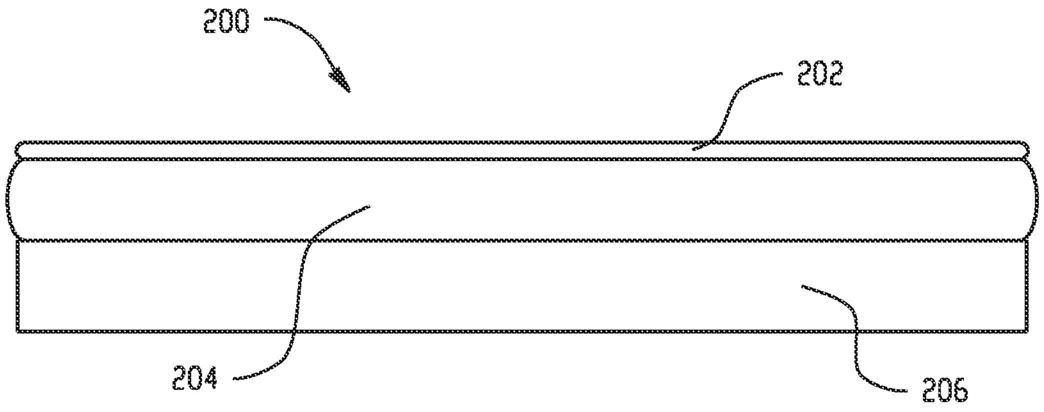
FIG. 12 depicts a mattress topper including an array of air bladders for use in the active comfort bedding system in accordance with one or more embodiments.
Figure 13:
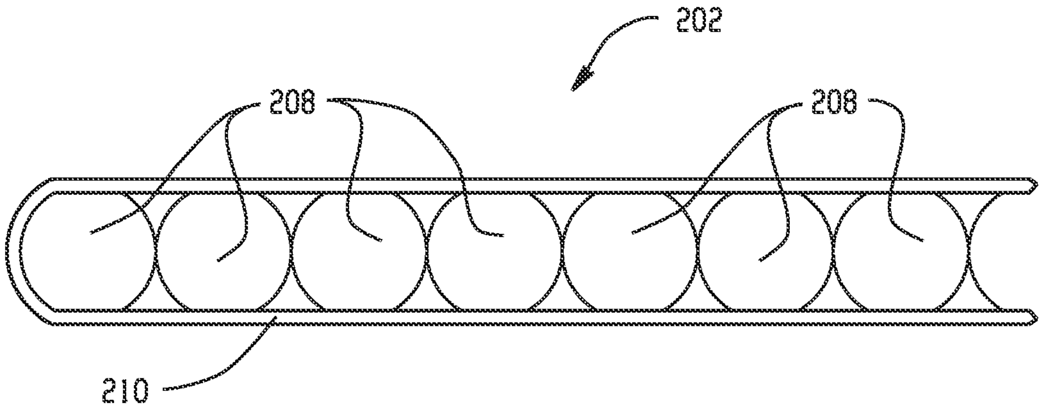
FIG. 13 also depicts a mattress topper including an array of air bladders for use in the active comfort bedding system in accordance with one or more embodiments.

In one or more embodiments, the plurality of air bladders as generally described above can be disposed within a mattress topper. Turning now to FIGS. 12-13, there is shown an exemplary mattress assembly 200 including a mattress topper 202 disposed on a mattress 204 and mattress foundation 206. As shown more clearly in FIG. 13, the mattress topper 202 includes a plurality of air bladders 208 enclosed within a padded fabric layer. The mattress topper 202 can be configured with a control unit programmed to selectively inflate the air bladders via a pump as previously described above in a repeating pattern to provide the end user with a massaging action, a therapeutic benefit, or the like. In these embodiments, each one of the air bladders further includes a pressure sensor for sensing pressure within each of the air bladders, which can then be used by the controller to provide a repeatable pressure change in selected air bladders via the pump. The pump and the air bladders are fluidly coupled via a manifold as previously described.

To facilitate operation of the bedding systems described above, the bedding systems can further include one or more sensors. The types of sensors are not intended to be limited and may include pressure sensors, load sensors, force sensors, temperatures sensors, humidity sensors, motion sensors, vibrational piezoelectric sensors and the like. The bedding systems further include a control system as described above in operative communication with the sensors and configured to receive signals therefrom, which can be used to adjust pressure and/or air flow to the end user as well as continually monitor the occupancy, position, and/or sleep state of the end user. As such, the control system can responsively adjust the pressure and/or air flow to the end user based on the occupancy, position, and/or sleep state. The control system can include a processor, a memory, and a transceiver and may communicate with the plurality of sensors wirelessly or via wired connections. In exemplary embodiments, the control system is configured to collect the information received from the one or more sensors in the memory. In one embodiment, the processor may be disposed within the active comfort controlled bedding system. In other embodiments, the processor may be located proximate to the active comfort controlled bedding system.

In exemplary embodiments, the processor may be a digital signal processing (DSP) circuit, a field-programmable gate array (FPGA), an application specific integrated circuits (ASICs) or the like. The processor can be any custom made or commercially available processor, a central processing unit (CPU), an auxiliary processor among several processors, a semiconductor based microprocessor (in the form of a microchip or chip set), a macroprocessor, or generally any device for executing instructions.

In exemplary embodiments, the control system is configured to communicate with a user interface that a user of the active comfort controlled bedding system can use to modify one or more settings of the control system. In one embodiment, the control system includes a Bluetooth® or Wi-Fi transceiver that can be used to communicate with a wireless device or wireless network. In exemplary embodiments, the control system is configured to connect to a web-service over a Wi-Fi connection and a user of the active comfort controlled bedding systems (including variable firmness control and/or variable climate control) mattress can use the web-service to modify one or more settings of the control system and to view data collected by the control system that is stored in the memory. In exemplary embodiments, data collected by the control system may be stored locally, on a wireless device or a web-based Cloud service.

In exemplary embodiments, the one or more settings of the control system may include a desired firmness for each zone of the active comfort controlled bedding system that can be changed by altering the pressure within one or more of the air bladders, e.g., a repeating pattern. Likewise, one or more settings of the control system may include a desired climate setting corresponding to areas of the bedding system configured for air flow as discussed above, e.g., the head, lumbar, and upper leg regions. For example, it has been found that ambient air flow to the head region including the neck area of the end user can effectively increase comfort by reducing temperature via evaporative cooling as the neck area is prone to sweating when the end user feels hot. In exemplary embodiments, the user interface may allow a user to view statistics gathered on the quality of their sleep and may provide suggested changes to various climate settings to help improve the quality of the user's sleep. In exemplary embodiments, the processor may be configured to analyze the statistics gathered on the quality of a user's sleep and to make automatic adjustments to the various climate settings to help improve the quality of the user's sleep. In exemplary embodiments, the analysis of statistics can be executed on a wireless device or a web-based service.

For multi-user bedding systems, the pressure and/or temperature feedback can allow the active comfort bedding system to actively maintain a desired pressure and/or comfortable climate with respect to each occupant. Since no two occupants are identical, the system can be configured to sense the pressure and/or the surface temperature and/or relative humidity and responds accordingly rather than a one size fits all approach.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A process of providing a massaging action to an end user in an active comfort controlled bedding system, the process comprising:

adjusting an internal pressure within a plurality of air bladders provided in an innercore unit having an applied load thereon from an end user, wherein each one of the plurality of air bladders includes a pressure sensor configured to measure pressure within a respective air bladder and are transversely positioned relative to a longitudinal axis of the bedding system, and wherein adjusting the internal pressure comprises providing a repeating pattern defined by a pressure increase and subsequent decrease in a selected one of the plurality of air bladders followed a pressure increase and subsequent decrease in a selected other one of the plurality of air bladders to provide the massaging action, wherein an initial air pressure in the plurality of air bladders underlying an intermediate seat region of the active comfort controlled bedding system is greater than an initial air pressure in the plurality of air bladders underlying a leg and foot region, wherein, relative to the initial air pressures, a volume of air exhausted from the selected plurality of air bladders by a pump during the subsequent pressure decrease to effect deflation is greater than a volume of air admitted in the selected plurality of air bladders during the pressure increase to effect inflation.

2. The process of claim 1, wherein the plurality of air bladders are disposed in a mattress topper.

3. The process of claim 2, further comprising conditioning an upward flow of air through the mattress topper during the massaging action.

4. The process of claim 3, further comprising filtering the upward flow of air through the mattress topper during the massaging action.

5. The process of claim 1, wherein the repeating pattern is a wave pattern.

6. The process of claim 1, wherein the plurality of air bladders are disposed in an innercore unit.

* * * * *